United States Patent
Blessing et al.

(10) Patent No.: US 8,577,573 B2
(45) Date of Patent: Nov. 5, 2013

(54) METHOD FOR ADAPTING THE KISS POINT

(75) Inventors: Uli Christian Blessing, Heilbronn (DE); Markus Schuerlein, Freiberg am Neckar (DE); Joerg Meissner, Bretzfeld (DE)

(73) Assignee: GETRAG Getriebe- und Zahnradfabrik Hermann Hagenmeyer GmbH & Cie KG, Untergruppenbach (DE)

( * ) Notice: Subject to any disclaimer, the term of this patent is extended or adjusted under 35 U.S.C. 154(b) by 409 days.

(21) Appl. No.: 12/946,790

(22) Filed: Nov. 15, 2010

(65) Prior Publication Data

US 2011/0125378 A1     May 26, 2011

(30) Foreign Application Priority Data

Nov. 20, 2009 (DE) .......................... 10 2009 053 885

(51) Int. Cl.
*B60W 10/10*     (2012.01)

(52) U.S. Cl.
USPC .............................................. 701/68; 192/31

(58) Field of Classification Search
USPC ........... 701/68; 74/337, 731.1, 322, 661, 866, 74/340; 477/3, 74, 84, 77, 78, 5, 8, 34, 86; 192/84.6, 99 R, 3.51, 3.54–3.56, 20, 192/30 R, 31
See application file for complete search history.

(56) References Cited

U.S. PATENT DOCUMENTS

| | | | | |
|---|---|---|---|---|
| 6,001,044 A | * | 12/1999 | Amendt | 477/180 |
| 6,086,514 A | * | 7/2000 | Jones et al. | 477/180 |
| 6,506,139 B2 | * | 1/2003 | Hirt et al. | 477/3 |
| 7,850,570 B2 | * | 12/2010 | Jager et al. | 477/77 |

FOREIGN PATENT DOCUMENTS

| | | |
|---|---|---|
| DE | 19540921 A1 | 5/1997 |
| DE | 19652244 A1 | 6/1997 |
| DE | 19745675 C1 | 5/1999 |
| DE | 19751455 A1 | 5/1999 |
| DE | 19939818 C1 | 1/2001 |
| DE | 10101597 A1 | 8/2001 |
| DE | 10054867 A1 | 5/2002 |

(Continued)

OTHER PUBLICATIONS

European Search Report; Application No. EP 10 19 1289; Nov. 25, 2011.

*Primary Examiner* — Dalena Tran
(74) *Attorney, Agent, or Firm* — Knobbe, Martens, Olson & Bear, LLP

(57) ABSTRACT

A method for setting the engagement point of a friction clutch of a multi-step transmission for a motor vehicle. The friction clutch can be activated, controlled, by means of a clutch actuator. A set point value of the clutch actuator is set for the engagement point of the friction clutch as a function of a time profile of a physical variable which occurs starting from a transition state after activation of the friction clutch to a transition value. An electric machine is connected to the multi-step transmission. Influencing of the multi-step transmission by the electric machine is taken into account in the setting of the engagement point of the friction clutch.

16 Claims, 7 Drawing Sheets

(56) References Cited

FOREIGN PATENT DOCUMENTS

| | | |
|---|---|---|
| DE | 10113700 A1 | 9/2002 |
| DE | 10224064 A1 | 12/2003 |
| DE | 10244393 A1 | 4/2004 |
| DE | 102007057081 A1 | 6/2009 |
| DE | 102008011082 A1 | 8/2009 |
| EP | 0859171 A1 | 8/1998 |
| EP | 0931961 A1 | 7/1999 |
| EP | 1067008 A1 | 1/2001 |
| EP | 1741950 A1 | 1/2007 |
| EP | 2014946 A2 | 7/2007 |
| EP | 2107263 A1 | 7/2009 |
| EP | 2107264 A1 | 7/2009 |
| EP | 2098745 A1 | 9/2009 |
| WO | WO2004076224 A1 | 9/2004 |
| WO | WO2004076225 A1 | 9/2004 |
| WO | 2009065458 A1 | 5/2009 |
| WO | WO2009065591 | 5/2009 |

\* cited by examiner

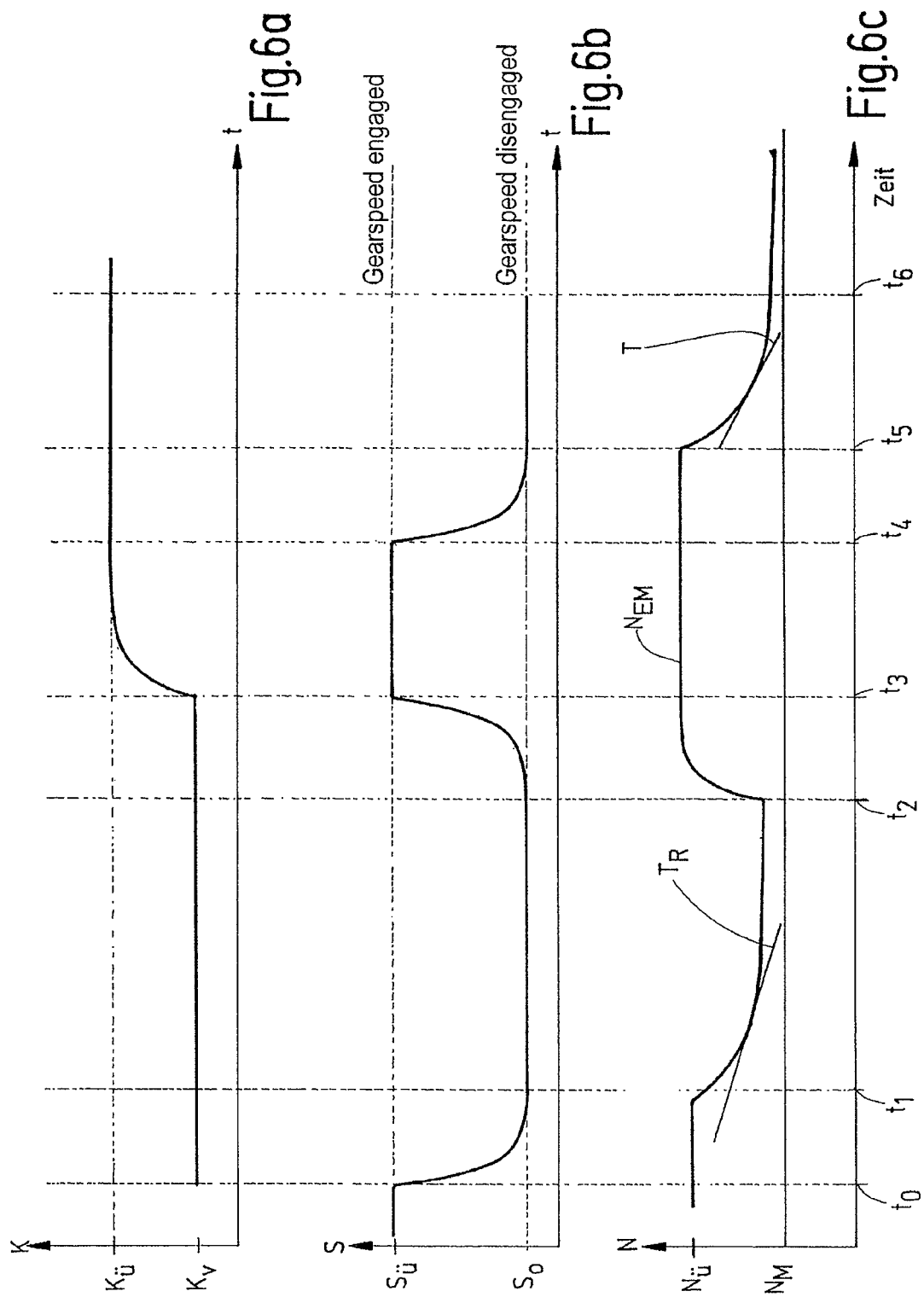

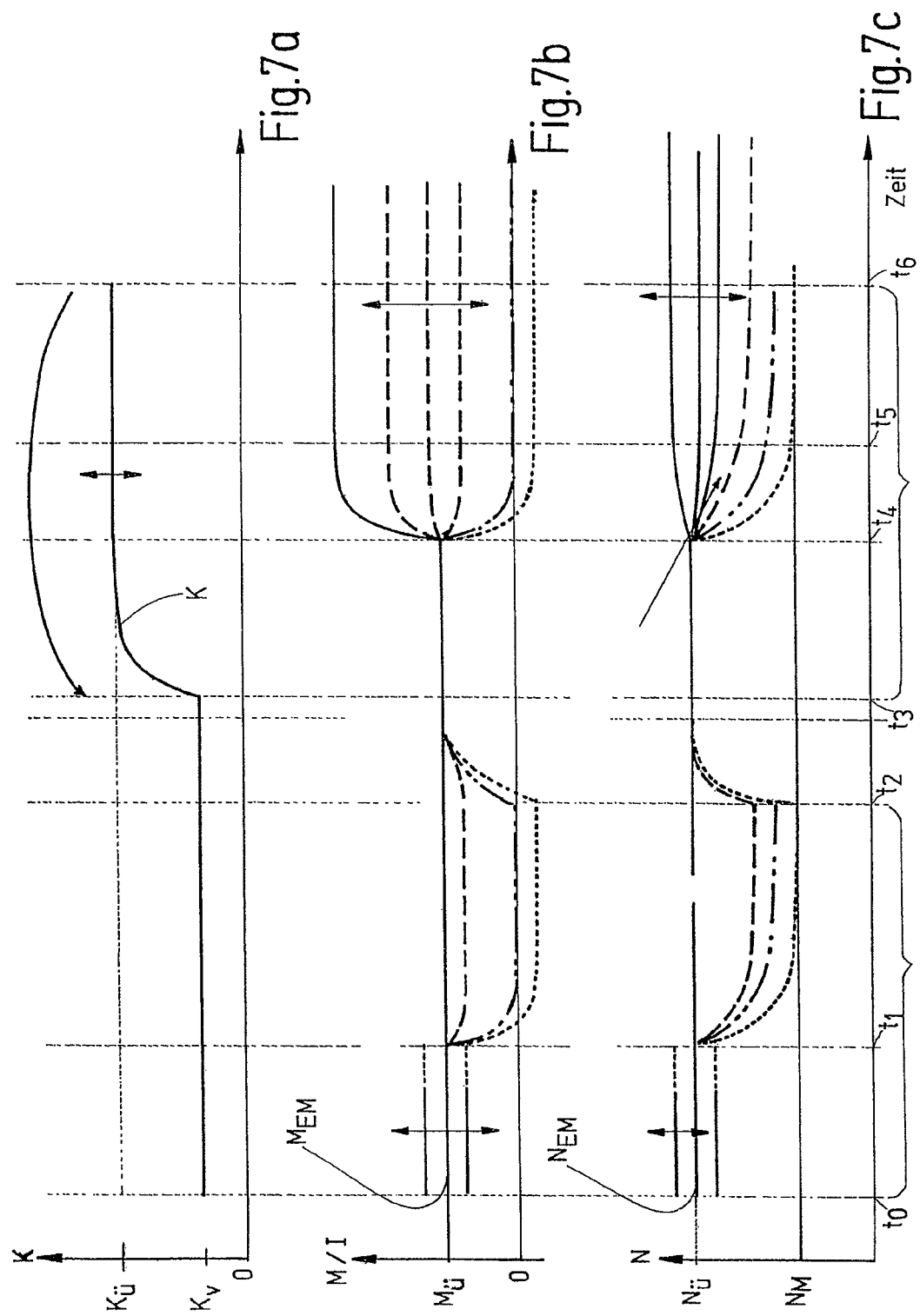

METHOD FOR ADAPTING THE KISS POINT

CROSS-REFERENCE TO RELATED APPLICATIONS

This application claims the priority of German patent application DE 10 2009 053 885, filed Nov. 20, 2009.

BACKGROUND OF THE INVENTION

The present invention relates to a method for setting the engagement point of a friction clutch of a multi-step transmission for a motor vehicle, in particular a friction clutch of a double clutch transmission.

In drive trains with a spur gear transmission, a friction clutch, which has the function of a starting clutch and disconnecting clutch, is generally arranged between the spur gear transmission and a drive engine (such as an internal combustion engine). In double clutch transmissions, a double clutch arrangement is provided between the two component transmissions and the drive engine. These friction clutches can be embodied as dry-running or wet-running clutches and are subject to a certain degree of wear. In conventional manually-shifted transmissions, the increasing wear of the clutch is compensated by modified activation of the clutch on the part of the driver.

In automated spur gear transmissions (such as automated shift transmissions (AST) or double clutch transmissions (DCT)), the friction clutch is generally activated by an assigned shift clutch actuator. The clutch actuator can be, for example, a hydraulic actuator or an electromechanical actuator.

The actuator can additionally be embodied so as to be controlled either by pressure, force or travel.

The friction clutch is, as a load clutch, configured to transmit, at least briefly, even high torques which correspond to the torque which is output by the drive engine, or which are usually even larger. For comfortable engagement of the clutch, the friction clutch has to be changed from the opened state to the closed state via a slipping state. In this context, the input element and the output element of the friction clutch come to bear one against the other, with a torque being transmitted starting from a certain time. A point (a manipulated value of the clutch actuator) at which the friction clutch transmits a certain, relatively small torque, for example a value <20 Nm, is defined as an engagement point of the friction clutch at which a certain degree of transmission of torque is possible.

For safe, comfortable and also fast shift processes it is highly important in automated multi-step transmissions to know at which manipulated value of the clutch actuator this engagement point is reached. As mentioned above, this manipulated value can change owing to wear (for example of the clutch plates), mechanical tolerances or through other interference variables (for example setting of the clutch springs) in the course of time. Parameters which can change over a relatively short time, such as for example the temperature, also play a role here.

Various methods have become known for setting the engagement point of a friction clutch.

Document DE 196 52 244 A1 relates to a method for adapting the kiss point, wherein the engine torque is measured as an important parameter. A basic approach is to set a plurality of operating points in order to achieve reliable adaptation on the basis of said operating points by forming mean values.

WO 2004/076224 A1 discloses determining the torque which is transmitted by a friction clutch by comparing the rotational speeds of the engine and the transmission input, specifically while taking into account the synchronizing force, in particular in the overrun mode, while the engagement force is increasing.

A characteristic curve adaptation when the engine is running is known from WO 2004/076225 A1, wherein the clutch is closed with a defined value, subsequently a gearspeed is increasingly synchronized and then the synchronizing manipulated value at which the rotational speeds of the transmission input and the engine move away from one another is determined.

EP 0 931 961 A1 relates to a calibration method for a control clutch at a constant engine rotational speed, wherein the clutch calibration value is acquired from a target rotational speed change time which is determined from a profile resistance time. The profile resistance time represents a change in rotational speed which depends on the frictional characteristic, wherein, in particular, the clutch is opened and closed and the time within which the rotational speed of a gearwheel changes by a specific absolute value is measured.

A similar iterative method is known from EP 0 859 171 A1.

Document DE 195 40 921 A1 relates to the idea of randomly actuating a clutch in order to produce the relationship between the clutch torque and the manipulated variable.

A method for controlling the transmission of torque is also known from DE 199 39 818 C1. In this context, the velocity due to the engagement of a clutch is to be unequal to zero, wherein a parallel clutch is kept disengaged. The engagement point of the parallel clutch is determined by at least partial engagement of this clutch, wherein, in particular, the change in the rotational speed over the time of one half of a clutch is measured.

DE 102 44 393 A1 relates to the determination of the engagement point by measuring the pressure profile and by determining the first derivative thereof on a hydraulic cylinder.

DE 100 54 867 A1 discloses a method for determining a creepage point of a friction clutch. A first creepage point is set and the clutch torque is measured. A second creepage point is then set if there is no correspondence present in the first step. In this context, a value between the biting point and the first creepage point is then selected as a reference point. The new second creepage point is then set in such a way that a correspondence occurs between the desired torque and the torque which is actually transmitted.

A method for determining an engine friction torque is known from DE 101 13 700 A1. The method is used to determine, from the engine torque, the torque which is present at the friction clutch.

In addition, a method is known for determining a grip point of a friction clutch from EP 1 741 950 A1. A friction clutch is opened so that the transmission input rotational speed drops. The clutch is then closed again until the drop in the rotational speed is stopped. The clutch is subsequently closed further until the rotational speed remains the same or drops. The grip point is calculated from this.

A method for controlling a change of gearspeed in which the engine torque and the clutch torque are controlled is known from DE 101 01 597 A1. The control takes place as a function of differences in rotational speed.

Document DE 197 51 455 A1 relates to a method for controlling a clutch in which a set point clutch capacitance is set by means of a closed-loop controller on the basis of a characteristic function. The characteristic function is continuously adapted here.

A method for changing gearspeed is known from DE 102 24 064 A1. In said document, synchronization is triggered by determining a "switch-off point" which depends on a gradient of the rotational speed of the synchronized gearwheel.

Finally, EP 1 067 008 A1 discloses a method for clutch characteristic curve adaptation, specifically for a double clutch transmission.

In this context, in each case the clutch characteristic curve of a clutch which is currently not being used to transmit a torque (referred to as the free friction clutch) is to be adapted. Said clutch is initially closed with a certain clutch actuating force, and the system waits until the transmission input shaft has reached the synchronizing rotational speed (that is to say is running at the same speed as the engine shaft). Subsequently, synchronization of the assigned free component transmission is activated until a sufficient difference in rotational speed is present. This synchronization is then released and the rotational speed gradient of the transmission input shaft is subsequently determined. The value of the previously transmitted clutch torque is calculated therefrom. On the basis of this value, a clutch characteristic curve adaptation is carried out in connection with the previously defined clutch actuating force.

In addition, a rapid method for setting the engagement point of a friction clutch is known from WO 2009/065591.

BRIEF SUMMARY OF THE INVENTION

Against this background, the object of the invention is to specify an improved method for setting the engagement point of a friction clutch.

This object is achieved by means of a method for setting the engagement point of a friction clutch of a multi-step transmission for a motor vehicle, in particular a friction clutch of a double clutch transmission, wherein the friction clutch can be activated, controlled, preferably closed-loop controlled, by means of a clutch actuator, wherein a set point value of the clutch actuator is set for the engagement point of the friction clutch as a function of a time profile of a physical variable which occurs starting from a transition state after activation of the friction clutch to a transition value, wherein an electric machine is connected to the multi-step transmission, and wherein influencing of the multi-step transmission by the electric machine is taken into account in the setting of the engagement point of the friction clutch.

Through the connection of the electric machine to the multi-step transmission, the multi-step transmission can be part of a hybrid drive train of a motor vehicle. The electric machine can be operated in order to make available drive torque (for example in what is referred to as a boost operating mode). In addition, the electric machine can preferably also be operated as a generator (for regeneration purposes).

The electric machine can be connected to the multi-step transmission via a clutch. However, the electric machine is preferably fixedly connected to the multi-step transmission, with the result that a rotor rotational speed of the electric machine is generally proportional to a rotational speed of a shaft of the multi-step transmission. This shaft is preferably an input shaft of the multi-step transmission or a shaft which is fixedly or constantly connected thereto.

The multi-step transmission can be influenced in different ways by the electric machine during the setting of the engagement point.

In many influencing methods, for example relatively steep (or else relatively flat) profiles of the physical variables arise, with the result that, for example, a gradient can be determined more precisely. In these cases, the electric machine generally acts passively on the setting method. However, it is advantageously also possible to include the electric machine actively in the setting method. As a result, particularly rapid and efficient setting methods can be implemented. This can also lead to faster setting methods.

In addition, the engagement point can also be set within relatively short phases in which the assigned component transmission is not required in the driving mode. In addition, it is possible not to delay a possibly imminent shift operation (in which the free component transmission is then used).

Conversely, increased probability arises that the method for setting the engagement point is not interrupted by a shift operation which is required by the driver or the driving mode.

A transition value may be a fixed value at which the friction clutch can transmit only a comparatively small torque (for example <20 Nm) or else, for example, a signal which varies over time.

Generally, the engagement point is set immediately as a function of the determined time profile (or the result thereof) of the physical variables (for example a rotational speed gradient value or a current value) after the method according to the invention has been carried out. It is consequently not necessary to calculate the torque which is transmitted by the friction clutch here. However, a certain relationship, which generally can also be calculated, exists between a determined value or gradient value and the torque which is transmitted by the friction clutch in the transition state. In other words, the transmitted clutch torque can be inferred from the value or gradient value in so far as said clutch torque is of interest.

The object is therefore completely achieved.

According to one particularly preferred embodiment, the production of the transition state includes setting the electric machine to a transition working point.

In this embodiment, the transmission can be placed in a defined state (for example adjusted to a specific rotational speed level) by means of the electric machine. Consequently, this defined state can advantageously be achieved without it being necessary to activate a clutch to engage or disengage a gearspeed of the multi-step transmission, as is necessary in the prior art. Accordingly, the setting method according to the invention can, for example, take place in one section between the disengagement of a source gearspeed and the engagement of a target gearspeed in the free component transmission of a double clutch transmission. Since the method does not have any influence on the transmission output, a multiplicity of different working points can additionally be set in a direct sequence.

It is of particular advantage here if the production of the transition state includes carrying out closed-loop adjustment of the electric machine to a transition rotational speed.

Such a rotational speed closed-loop adjustment process can be easily implemented since the functionality of a hybrid drive train which is implemented together with an electric machine generally provides such rotational speed closed-loop adjustment in any case. The transition rotational speed is here preferably a rotational speed which differs from a drive engine rotational speed, with the result that a differential rotational speed is present in the transition state in the friction clutch.

In this embodiment, it is further preferred if the set point value of the clutch actuator for the engagement point of the friction clutch is set as a function of a time profile of an electric current of the electric machine (and/or as a function of a final value of the current which is set), which electric current occurs starting from the transition state after activation of the friction clutch to the transition value.

In this context, the transition state is initially produced by setting the transition rotational speed in the multi-step transmission. Subsequently, the friction clutch is activated to the transition value by means of the clutch actuator. As a result, a torque is impressed on the multi-step transmission by means of the drive torque of the drive engine. In order to keep the rotational speed constant at the transition rotational speed (to perform closed-loop adjustment of the rotational speed thereto), a change in the electric current which is proportional to the change in torque which is compensated in this way occurs in the electric machine.

In this embodiment, it is consequently possible to determine, for example, a current value on the basis of which the engagement point of the friction clutch can be set.

According to an alternative embodiment, the production of the transition state includes carrying out closed-loop adjustment of the electric machine to a transition torque.

In this embodiment, for example a specific electric current is impressed on the electric machine, with the result that the electric machine outputs a specific torque. As a result, a specific rotational speed generally occurs in the multi-step transmission when the friction clutch is opened. The transition torque should be preferably selected here such that the rotational speed which is set when the friction clutch is opened differs from the drive rotational speed of the drive engine.

In this embodiment it is particularly preferred if the set point value of the clutch actuator for the engagement point of the friction clutch is set as a function of a time profile of a rotational speed which occurs starting from the transition state after activation of the friction clutch to the transition value.

If the friction clutch is activated to the transition value after the production of the transition state, the drive engine in turn transmits a torque to the multi-step transmission. Since closed-loop adjustment of the electric machine to a specific transition torque occurs, this results in a change in the rotational speed in the multi-step transmission. The engagement point can in turn be set by determining a gradient value of this change in rotational speed (and/or a final value of the rotational speed which is set).

While the preferred embodiments described above for the influencing of the multi-step transmission by means of the electric machine during the setting of the engagement point are of an active type, it is also possible to use the electric machine for this purpose without carrying out closed-loop adjustment of the electric machine to a transition torque or a transition rotational speed.

According to a further alternative embodiment it is therefore preferred if, the electric machine is coupled as a load to the multi-step transmission, wherein the production of the transition state includes activating at least one shift clutch for the engagement and disengagement of a gearspeed of the multi-step transmission by means of a shift actuator, and wherein the set point value of the clutch actuator for the engagement point of the friction clutch is set as a function of a time profile of a rotational speed which occurs if the shift clutch is opened after the transition state is produced.

In this embodiment, the multi-step transmission is placed in a defined state by actuating the shift clutch. As a result, a rotational speed is impressed on the multi-step transmission in a way which is proportional to a rotational speed of an output shaft of the multi-step transmission. The electric machine is dragged along as a load in the process.

In addition, in this context the friction clutch is set to a transition value, with the result that a torque is also transmitted into the multi-step transmission by the drive engine. If the shift clutch is subsequently opened, a change occurs in the rotational speed, in particular in a rotational speed of an input shaft of the multi-step transmission (and/or in a rotational speed of the electric machine). A gradient value which is determined therefrom can then be used to set the engagement point.

The electric machine is dragged along here as a load, with the result that a gradient value which is changed compared to the known methods is obtained. This can be advantageously used to set the engagement point more precisely.

According to one embodiment the electric machine here is operated in the idling mode during the transition state. In this context, the drag torque which is introduced into the multi-step transmission by the electric machine arises essentially as a result of mechanical resistance torques and/or frictional torques.

According to one alternative embodiment, the electric machine is operated in the short-circuit mode during the transition state.

In this embodiment, the electric machine acts as an eddy current brake as a result of electromagnetic induction, with the result that yet steeper gradient values can be obtained.

In the embodiment using the electric machine as a load it is advantageous if the shift actuator is actuated in the transition state in order to close the assigned shift clutch.

In this embodiment it is advantageous during the transition state that essentially no fluctuations in torque can occur across the shift clutch, and therefore constant rotational speed conditions are present at the start of the evaluation of the rotational speed gradient value.

According to one alternative embodiment, the shift actuator is actuated in the transition state in order to transmit a larger torque across the shift clutch than across the friction clutch without, however, closing the assigned shift clutch.

In this embodiment it is advantageous that a somewhat higher level of safety with respect to fault situations is provided since the assigned shift clutch of the free transmission is not placed in positively locking engagement.

During the setting of the engagement point of a friction clutch in a non-active branch of a double clutch transmission, the shift clutch which is used to set the engagement point can be assigned to any desired gearspeed of the free component transmission.

However, it is particularly advantageous if the shift clutch which is used to set the engagement point of the friction clutch is assigned to that gearspeed of the free component transmission which is adjacent to the gearspeed which is used in the active branch.

If, for example in the active branch, the gearspeed 3 (the third gearspeed) is engaged, it is possible to use, for example, the shift clutch for the gearspeed 2 or the shift clutch for the gearspeed 4 for setting the engagement point of the friction clutch in the free branch. It is advantageous here that the rotational speed differences which have occurred do not become so large that the processing of the method according to the invention can take place overall in a rapidly quick time and with less wear.

It is particularly advantageous in all the embodiments if the clutch actuator in the transition state is set to a transition value which corresponds to the previous set point value for the engagement point.

This makes it possible to ensure that the setting of the engagement point takes place on the basis of conditions such as are present in the normal friction clutch operating mode when the engagement point is reached. However, it is generally also conceivable to set the clutch actuator in the transition state to another value other than the previous set point value, wherein the transition value should be defined in such a way that the friction clutch can only transmit a comparatively low torque (for example <20 Nm).

Overall, it is, in addition, advantageous if the engagement point of the friction clutch is set in a non-active branch of a double clutch transmission while the vehicle is travelling.

In an automated spur gear transmission with just one input clutch and a single transmission branch, such a procedure cannot be implemented since in the driving mode the single friction clutch and the transmission are not free. In a double clutch transmission it is, on the other hand, possible to use the free branch (i.e. the free component transmission and the free friction clutch) to perform setting of the engagement point of the free friction clutch, specifically during the driving mode and transmission of a torque to the output via the other branch of the double clutch transmission. Of course, in this way both friction clutches of the double clutch transmission are adapted in the driving mode depending on which branch is currently free.

While in the case of the double clutch transmission the setting of the engagement point of the friction clutch can take place in the non-active branch during driving, in an alternative embodiment there is provision for the setting of the engagement point of the friction clutch to be carried out while the vehicle is stationary.

This embodiment can, of course, be applied in double clutch transmissions, inter alia when the engagement point of a clutch is being learnt. However, it is, for example, also possible to carry out this embodiment in an automated spur gear transmission with just one friction clutch and a single transmission branch.

It is generally possible both in such automated shift transmissions and in double clutch transmissions to carry out the setting of the engagement point during the stationary state of the vehicle if the production of the transition state includes setting the electric machine to a transition working point, as mentioned above. In this case, the clutches of the multi-step transmission remain opened, with the result that no drive power is transmitted to the driven wheels.

In this embodiment, as in all the other embodiments, it is advantageous here if a drive engine of the motor vehicle, such as for example an internal combustion engine, is operating, with the result that a specific rotational speed (for example an idling speed or else some other rotational speed) is set on the input side of the friction clutch.

It is generally preferred if the method according to the invention is carried out for setting the engagement point for different working points of such a drive engine, that is to say for example at different rotational speeds on the input side of the friction clutch. In this context, the engagement point of the clutch can then consequently be set as a function of the respective working point. In particular it is possible to set the engagement point for different differential rotational speeds which are applied via the friction clutch. If the electric machine is used to produce the transition state (setting to a transition working point), such different differential rotational speeds can be set in a comparatively easy and targeted fashion. It is not necessary in this context to rely, as in the prior art, on the fact that such differential rotational speeds are set sometime in the normal operating mode of the motor vehicle (and that in this case there is then also sufficient time available to carry out the setting method).

According to one overall preferred embodiment, before the setting of the engagement point a reference measurement is carried out in order to determine the behaviour which occurs as a result of frictional losses (for example of bearings in the transmission etc.) and as a result of the drag torque of the clutch, and to take said behaviour into account in later settings of the engagement point.

The drag torque can be composed, for example, of a clutch drag torque, and a torque loss in the transmission and a drag torque of the electric machine (machine drag torque).

The precision of the setting of the engagement point can be improved as a result of this. In other words, the adaptation of the engagement point can be set independently of the prevailing drag torque.

It is particularly advantageous here if the same method is carried out during the reference measurement as during the setting of the engagement point, while the friction clutch, however is opened.

In other words, the reference measurement can be carried out in the same way as the method according to the invention in which the clutch actuator is set to a transition value. However, in the reference measurement, the friction clutch remains opened in order in this way to observe the behaviour of the multi-step transmission and to be able to take it into account in the subsequent setting of the engagement point according to the method of the invention.

In addition, in the embodiment using a clutch it is preferred if the opening of the clutch in the method according to the invention takes place from the transition state after the transition value of the clutch actuator has reached a value within a set point range.

In this way it is possible to ensure that the opening of the clutch from the transition state does not take place until a predefined state has been reached at the friction clutch.

According to a further overall preferred embodiment, the rotational speed gradient value as a function of which the set point value of the clutch actuator is set for the engagement point is the rotational speed gradient value of the input shaft of the transmission.

In automated shift transmissions there is generally a sensor present which measures this input rotational speed. There is therefore no additional expenditure on hardware necessary in order to implement the method according to the invention.

In a double clutch transmission it is understood that in each case the rotational speed of the input shaft of the assigned (free) component transmission is monitored in order to determine the rotational speed gradient value.

In addition, it is to be noted in this context that when, within the scope of the present application, a rotational speed or a rotational speed gradient of a specific shaft is mentioned, it is therefore possible in the same way for the rotational speed or the rotational speed gradient of any other shaft whose rotational speed is proportional thereto to be meant (that is to say for example a positively locking or frictionally locking connection such as via a wheel set or a closed clutch).

Since the electric machine is preferably fixedly connected to the input shaft of the transmission or a shaft which is constantly connected thereto, as a rule the rotational speed of the electric machine is also proportional to the rotational speed of the input shaft of the transmission. The determination of the rotational speed gradient value can take place here in the method in which the clutch is used in a way described in detail in WO 2009/065591. The disclosed content should accordingly be included here by reference.

According to one preferred embodiment, the transition state is produced by carrying out a process for setting the clutch actuator to a transition value and a process for setting the shift actuator to a transition value in parallel at least in certain sections.

In a similar way to that above, preferred embodiments for carrying out these processes in parallel in certain sections are described in WO 2009/065591, to the content of whose disclosure reference is made here.

Overall, with the present invention it is possible to achieve at least one of the following advantages depending on the embodiment:

Chronologically rapid processing of the method for setting the engagement point or for adapting the characteristic curve occurs.

The method of measurement of the rotational speed gradient is independent of the starting differential rotational speed since the effects of the μV curve (coefficient of friction plotted against the differential rotational speed) are not included, in particular if a filtered value is used as a rotational speed gradient value.

The method of measurement of the rotational speed gradient does not presuppose any quasi-steady-state conditions.

Monitoring of a clutch actuation signal is possible. For example, during the transition state the clutch actual pressure can be monitored. When the deviation set point pressure is too large, the method can, for example, be aborted.

When a reference measurement is carried out with the clutch open, the drag torque which acts on the free component transmission, and which is obtained, for example, from a clutch drag torque, a torque loss of the multi-step transmission and a machine drag torque, can be taken into account.

Processing of the actuation of the clutch actuator and of the shift actuator as far as possible in parallel is made possible by the hardware and software.

A good shift quality and a good starting process (safety criterion) is obtained over the service life.

The method according to the invention can take place as often as possible (whenever the necessary peripheral conditions are met), but can also be carried out only at specific times (for example at the earliest every 30 seconds or else a significantly longer value, for example every day), or exclusively during maintenance work.

If the electric machine is set to a transition working point and shift clutches of the assigned multi-step transmission remain opened in the process, the method according to the invention can be carried out independently of the other peripheral conditions for various working points (for example differential rotational speeds across the friction clutch).

It is generally also possible to monitor the driving behaviour and to carry out the method according to the invention as a function thereof.

The method can also be reversed by virtue of the fact that the clutch pressure sensor is checked by means of the method according to the invention, specifically on the assumption that the engagement point of the friction clutch is set correctly.

It goes without saying that the features which are mentioned above and the features which are still to be explained below can be used not only in the respectively specified combination but also in other combinations or alone without parting from the scope of the present invention.

BRIEF DESCRIPTION OF THE SEVERAL VIEWS OF THE DRAWING

The exemplary embodiments of the invention are illustrated in the drawing and will be explained in more detail in the following description, in which:

FIG. 6 shows diagrams of a friction clutch manipulated value and of a clutch manipulated value and of rotational speeds in order to explain a further method according to the invention; and FIG. 7 shows diagrams of a friction clutch manipulated value, of a torque value of an electric machine and of rotational speeds in order to explain further embodiments of methods according to the invention.

DETAILED DESCRIPTION OF THE INVENTION

Figure 1:
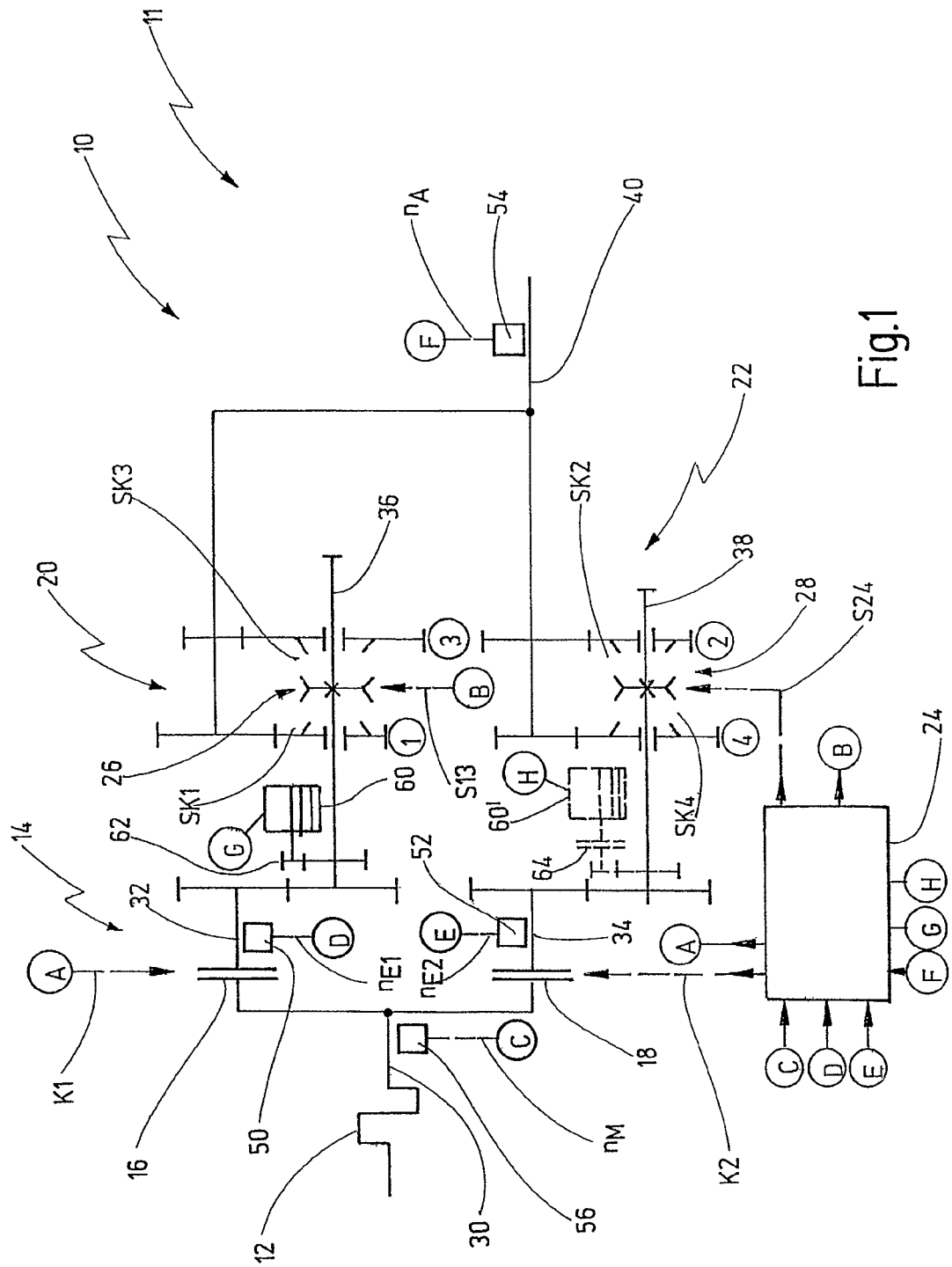
FIG. 1 shows a schematic illustration of a double clutch transmission for a motor vehicle.

FIG. 1 shows in a schematic form a drive train of a motor vehicle 11, wherein the drive train has a drive engine 12, such as an internal combustion engine (or else an electric motor or a hybrid drive unit) and a double clutch transmission 10.

The double clutch transmission 10 includes a double clutch arrangement 14 with a first friction clutch 16 and a second friction clutch 18.

In addition, the double clutch transmission 10 has a first component transmission 20 and a second component transmission 22. The first friction clutch 16 and the first component transmission 20 form a first branch, and the second friction clutch 18 and the second component transmission 22 form a second branch of the double clutch transmission 10.

In addition, the double clutch transmission 10 includes a control device 24 which is configured to actuate the double clutch transmission 10 (and if appropriate other components of the drive train) in an automated fashion.

The double clutch transmission 10 has a plurality of gearspeeds, wherein the uneven gearspeeds are assigned to the first component transmission 20, and the even gearspeeds are assigned to the second component transmission 22. The double clutch transmission 10 can have five, six, seven or more gearspeeds. For reasons of clearer presentation, the double clutch transmission 10 in FIG. 1 is illustrated only with four gearspeeds. The gearspeeds 1 and 3 are activated by a clutch package 26 which has a first shift clutch SK1 and the second shift clutch SK3. The gearspeeds 2 and four are activated by a second clutch package 28, which in turn has a first shift clutch SK2 and a second shift clutch SK4.

The shift clutches SK are each embodied as synchronous clutches. Alternatively it is also conceivable for the shift clutches to be embodied as simple dog clutches, in which case, however, additional means for synchronizing have to be provided, such as for example a separate brake or the like, which can carry out the corresponding synchronization function.

The input elements of the friction clutches 16, 18 are jointly connected to an engine output shaft 30 of the drive engine 12.

The output element of the friction clutch 16 is connected to a first transmission input shaft 32 of the first component transmission 20. The output element of the friction clutch 18 is connected to a second transmission input shaft 34 of the second component transmission 22.

The first component transmission 20 has a layshaft 36. The second component transmission 22 has a second layshaft 38.

On the output side, the component transmissions 20, 22 are connected to a common transmission output shaft 40 which can be connected, for example, to a cardan shaft or an input element of an axle differential.

The illustrated layout of the double clutch transmission 10 and the illustrated sensor system and actuator system are to be understood in a merely exemplary fashion as a basis for the description of the invention. The invention which is explained below can be applied here both to drive trains for longitudinal installation or transverse installation, as well as to other types of transmissions which have on the input side a friction clutch which serves as a starting clutch and/or disconnecting clutch, and an element which is comparable to a clutch.

The control device 24 is connected to a schematically indicated clutch actuator K1 for activating the first friction clutch 16 and to a second clutch actuator K2 for activating the second friction clutch 18. In addition, the control device 24 is connected to a first shift actuator S13 for activating the clutch package 26 and to a second shift actuator S24 for activating the second clutch package 28. A sensor 50 detects the rotational speed nE1 of the first transmission input shaft. A sensor 52 detects the rotational speed nE2 of the second transmission input shaft 34. A sensor 54 detects the rotational speed nA of the transmission output shaft 40. A sensor 56 detects the rotational speed nM of the engine output shaft 30.

The drive power which is generated by the drive engine 12 is alternatively transmitted either via the first friction clutch 16 and the second component transmission 20 to the transmission output shaft 40 or via the second friction clutch 18 and the second component transmission 22 to the transmission output shaft 40. When drive power is transmitted via one of the component transmissions (for example via the gearspeed 3 in the component transmission 20), the friction clutch 18 of the other branch is opened, with the result that an adjacent gearspeed can already be engaged in the parallel (free) component transmission 22. In the traction operating mode, the next highest gearspeed is engaged, for example, and in the overrun mode, for example, the next lowest gearspeed is engaged. A gearspeed change then takes place by virtue of the fact that the two friction clutches 16, 18 are activated in such an overlapping fashion with the result that the gearspeed change can take place under load.

The drive train of the motor vehicle is illustrated in the embodiment illustrated in FIG. 1 as a hybrid drive train. In this context, an electric machine 60 is assigned to the first component transmission 20. To be more precise, the electric machine 60 is fixedly connected to the layshaft 36, specifically via a spur gear set 62. In other words, a rotor shaft (not denoted in more detail) of the electric machine 60 has a rotational speed which is proportional to the rotational speed of the transmission input shaft 32 of the first component transmission 20.

The electric machine 60 is fed from an energy store (for example a battery), not illustrated in more detail, and is actuated by the control device 24. For this purpose, corresponding power electronics can either be provided in the control device 24 or assigned to the electric machine 60.

In the illustrated exemplary embodiment, the electric machine is assigned to the component transmission 20 with the uneven gearspeeds. Accordingly, it is possible, for example, to carry out starting of the motor vehicle in a purely electric fashion by means of the gearspeed one. In addition, it is possible, for example in the case of a driving mode via the second component transmission 22, for regeneration to take place by virtue of the fact that one of the clutches of the first component transmission 20 is closed and the first friction clutch 16 remains opened.

The double clutch transmission can be equipped with only one such electric machine 60 in one of the component transmissions 20, 22. Alternatively, it is possible to assign an electric machine to both component transmissions 20, 22, as is shown by dashes in the case of 60' in FIG. 1. The electric machine 60' is in this context either likewise fixedly connected to the assigned layshaft 38 (or to the transmission input shaft 34). However, the electric machine 60' and/or the electric machine 60 can also be connected to the respective shafts via disconnecting clutches, as is shown schematically in the case of 64 in FIG. 1.

In order to set the engagement point of the friction clutches 16, 18, methods which can be applied to the double clutch transmission shown in FIG. 1 even if an electric machine is not assigned to any of the component transmissions 20, 22 will firstly be explained below with reference to FIGS. 2 to 4.

The setting of the engagement point takes place here in each case at the friction clutch via which no drive power is currently being transmitted, with the result that the method can also be implemented during travel.

Figure 2:
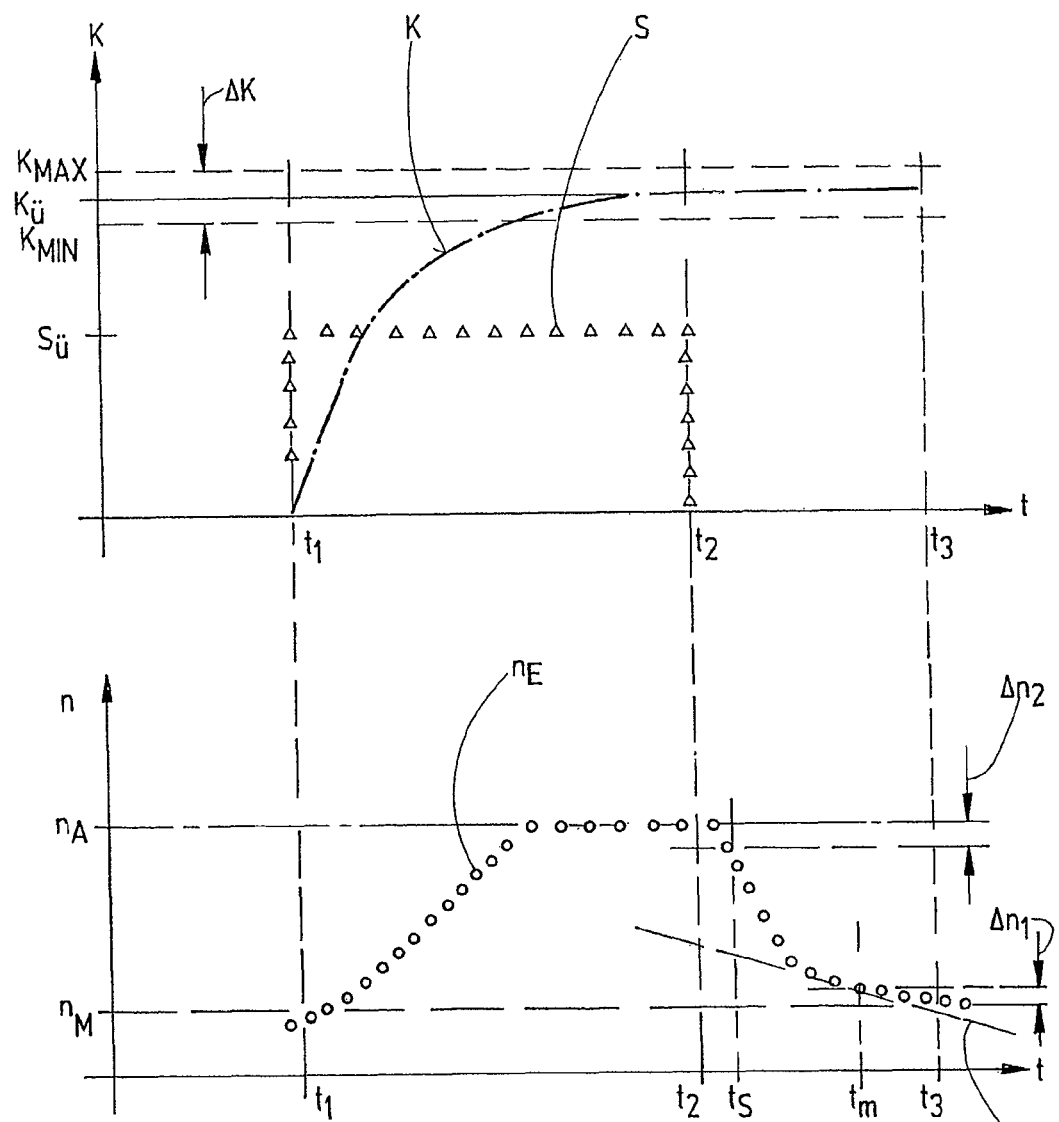
FIG. 2 shows diagrams of a friction clutch manipulated value and of a clutch manipulated value and of rotational speeds in order to explain a method which is not according to the invention.

FIG. 2 shows in a schematic form the essential sequences of the actuation of the clutch actuator K and of a shift actuator S used in the process as well as the rotational speed profile nE, resulting therefrom, of the assigned transmission input shaft.

In order to initiate the method for setting the engagement point of the friction clutch (for example of the friction clutch 16), the clutch actuator K and the shift actuator S are activated approximately simultaneously or in parallel with one another at t1 and is set to a transition value. The power transmission of the drive train occurs here via the other branch, with the result that the transmission output shaft 40 has a specific rotational speed nA, as is illustrated in FIG. 2. In addition, the drive engine 12 in the simplified illustration in FIG. 2 runs at a constant rotational speed nM.

In so far as in this context, for example, the second gearspeed is engaged in the power-transmitting component transmission 22, an adjacent gearspeed, for example the gearspeed 1, is engaged in the free component transmission. The shifting of the assigned shift clutch SK1 with the shift actuator S13 consequently increases the rotational speed nE of the free transmission input shaft (in the selected example the transmission input shaft 32). The rotational speed is increased here to a rotational speed which results from the transmission output shaft rotational speed nA and the transmission of the gearspeed, in this case the transmission of the first gearspeed. In this context, it goes without saying that the illustrations of the rotational speeds in FIG. 2 and the subsequent figures are respectively standardized, that is to say any transmissions or the like are calculated.

The transition value of the shift actuator S13 for activating the shift clutch SK1 is characterized by SÜ in FIG. 2. This can correspond to a set point value corresponding to a complete engagement of the assigned gearspeed or else to a defined value in order to place the shift clutch SK1 in a slipping state (synchronizing).

In parallel with this, as stated, the clutch actuator K is activated and actuated to a transition value KÜ. The transition value KÜ corresponds here to a value at which the assigned friction clutch 16 can only transmit a very small torque (for example <20 Nm). The transition value KÜ may be, for example, the set point value of the clutch actuator K for the engagement point of the assigned friction clutch 16.

Provided that the transition value of the clutch actuator K is reached (or a specific time afterwards), the assigned shift clutch is opened again, specifically at the time t2. Since the assigned friction clutch transmits a certain torque, the rotational speed nE of the assigned transmission input shaft 32 approaches the rotational speed nM of the drive engine 12 (at t3). Directly before this state is reached (at the time tm), the rotational speed gradient value which is then present is determined. The assigned value is indicated in FIG. 2 by a tangent T.

As explained, the rotational speed gradient value is determined at a time tm. The time tm corresponds to a state in which the rotational speed nE has approached the rotational speed nM up to a first differential rotational speed $\Delta n1$. Consequently, the rotational speed gradient can be the value of the rotational speed gradient at the time tm.

However, the rotational speed gradient value is preferably determined in the course of a filtering process.

FIG. 2 illustrates that starting from a time ts the rotational speed gradient is determined continuously (for example every 5 to 25 ms). The time ts corresponds to a time at which the rotational speed nE has decreased by a second differential rotational speed $\Delta n2$ with respect to the rotational speed nA. The value of $\Delta n1$ may be in the range from 50 to 200 rpm, and may preferably be approximately 100 rpm. The value of $\Delta n2$ may be of the same order of magnitude.

The majority of measured values of the rotational speed gradient between ts and tm is filtered by virtue of the fact that relatively new measured values are given greater weighting than relatively old measured values. In this context, the filtering can be carried out according to the following recursion formula:

$$DG_{n+1}(\text{filtered}) = DG_{n+1}(\text{unfiltered}) * K1 + DG_n(\text{filtered}) * K2$$

where $DG_n$ is the n-th measured value of the rotational speed gradient, and where K1 and K2 are constants for which the following applies: K1>K2. In addition, it is preferably true that K1+K2=1. K1 can, for example, lie in the range from 0.6 to 0.95, particularly preferably in the range from 0.7 to 0.9.

The rotational speed gradient value is the last filtered measured value of the rotational speed gradient at the time tm.

The gradient value (rotational speed gradient value) of the tangent T is a measure of which torque is transmitted by the friction clutch 16 on the basis of the transition value KÜ. Accordingly, in a subsequent method step the set point value of the clutch actuator K for the engagement point of the assigned friction clutch 16 can be set or adapted on the basis of this rotational speed gradient value.

Consequently, within the scope of the method for setting the engagement point of the assigned friction clutch a transition state is produced in which the clutch actuator K and the shift actuator S are set essentially simultaneously (at the time t1) to a respective transition value KÜ and SÜ, respectively. On the basis of this transition state, the assigned shift clutch SK is subsequently opened (at the time t2), with the result that a rotational speed gradient value is obtained on the basis of which the set point value of the clutch actuator K for the engagement point of the assigned friction clutch 16 is set or adapted. This method is also referred to as kiss point adaptation.

As is illustrated in addition in FIG. 2, range monitoring takes place with respect to the manipulated variable of the clutch actuator K. The opening of the assigned shift clutch at the time t2 takes place at the earliest when the manipulated value of the clutch actuator K lies in a range between Kmin and Kmax. The assigned range is denoted by $\Delta K$ in FIG. 2.

It generally goes without saying that the described method can also be applied by virtue of the fact that the next lowest gearspeed (such as the gearspeed 1 in the example above) is not selected in the free branch but rather the next highest gearspeed. In general, it is of course, also conceivable to use gearspeeds, other than the gearspeeds which are adjacent to the gearspeed currently in use for transmitting power, in the component transmission which is parallel to the gearspeed currently in use.

Figure 3:
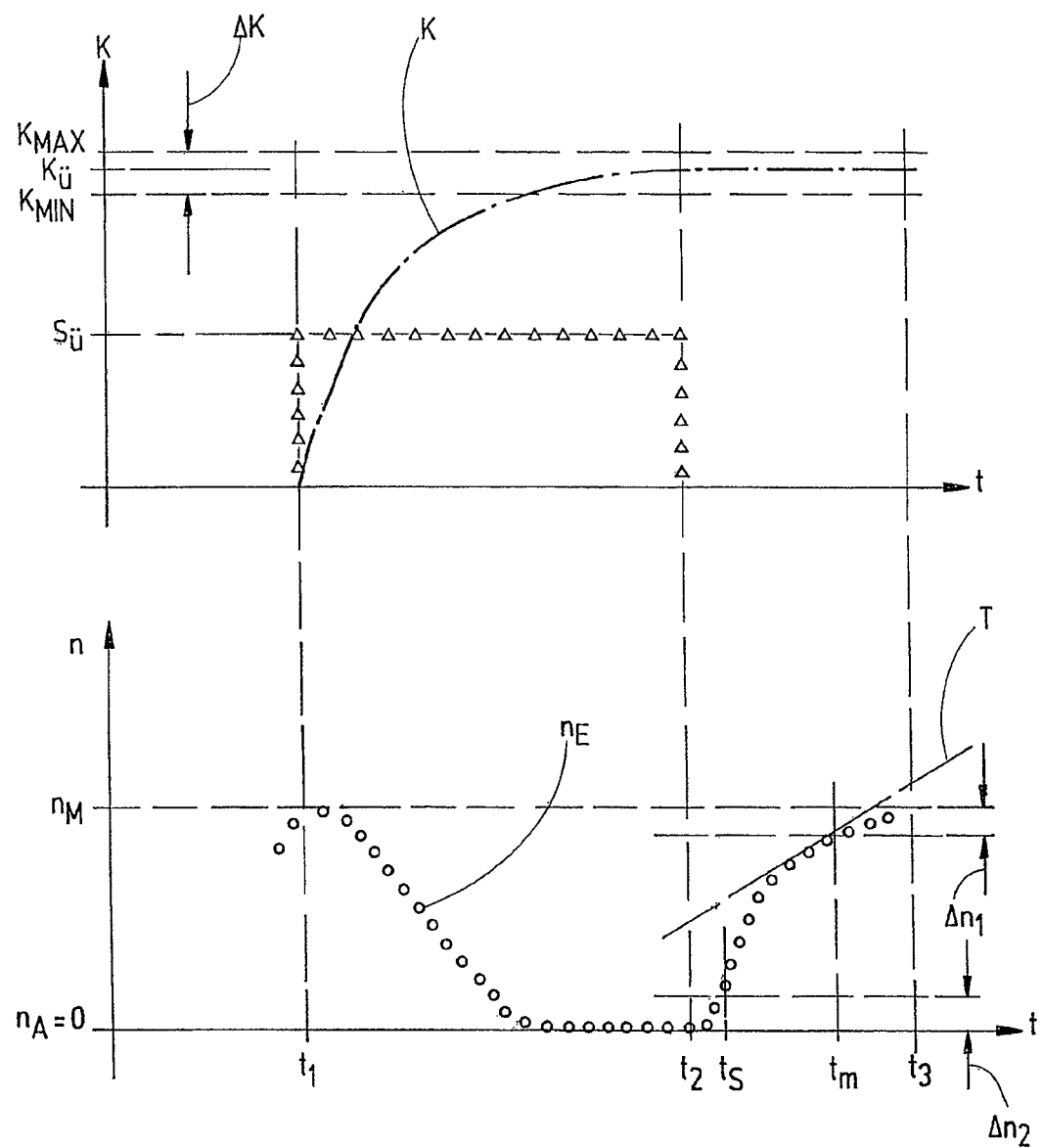
FIG. 3 shows an illustration, comparable to FIG. 2, of an alternative embodiment of a method which is not according to the invention.

FIG. 3 illustrates an alternative embodiment of the method. The method corresponds in all aspects to the method which has been described with reference to FIG. 2. The only difference is that the method takes place in the stationary state of the vehicle 11 (nA=0). Accordingly, the rotational speed nE of the assigned transmission input shaft is reduced to zero in the transition state, wherein the rotational speed nE increases to the value of the engine rotational speed nM after the opening of the clutch at the time t2.

The method in FIG. 3 can, for example, also be applied repeatedly for the purpose of training the controller 24 for the first setting of the engagement point of the respective friction clutch, wherein the set point value of the clutch actuator K is then set iteratively to the correct value for the engagement point.

Figure 4:
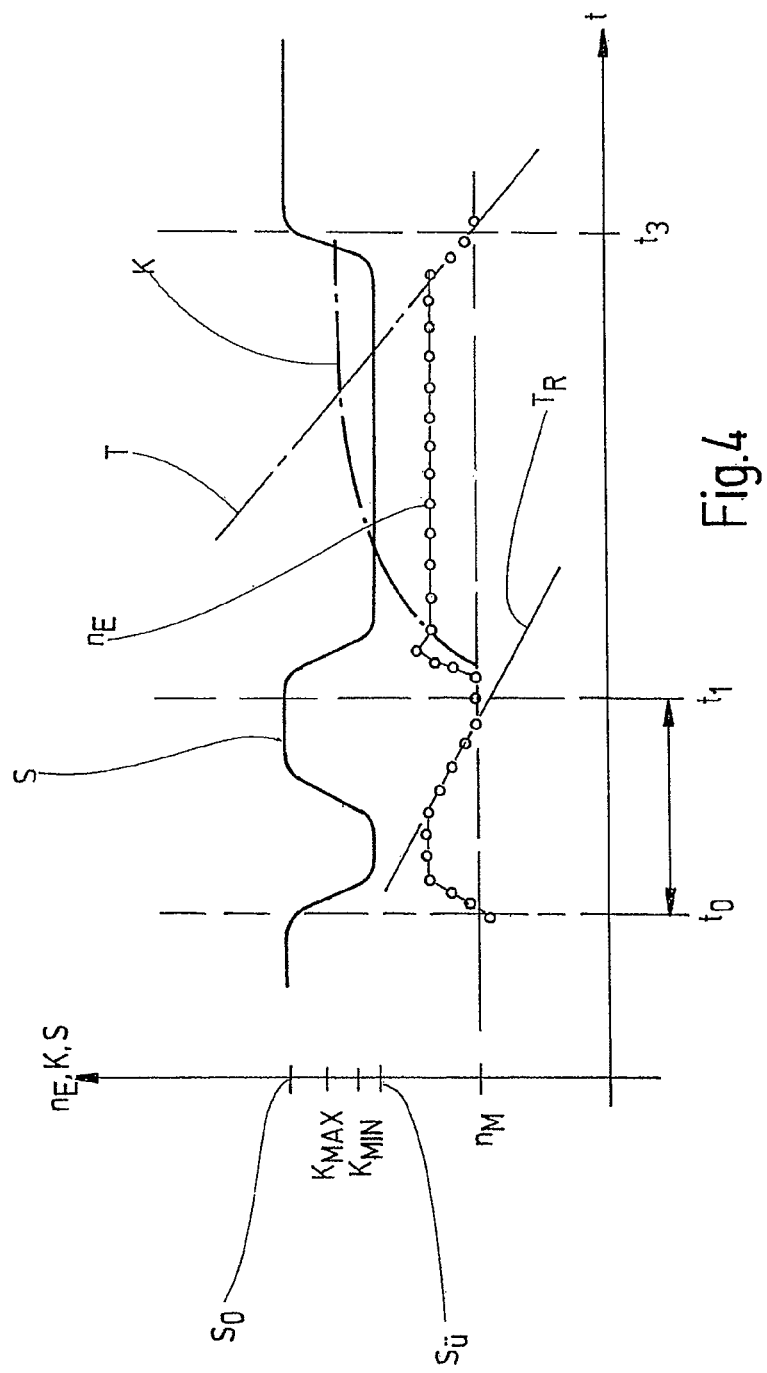
FIG. 4 shows an illustration, comparable to FIG. 2, in order to explain a further embodiment of a method which is not according to the invention.

FIG. 4 illustrates a further alternative embodiment of the method.

In the times t1 to t3 the method generally corresponds to the method which was illustrated in FIG. 2.

In the method in FIG. 4, a reference measuring method, which is generally similar to the subsequent measuring method (from the time t0 to t1), is made to precede the method according to the invention. In this reference measuring method, the shift actuator S is set in advance to the transition value SÜ, but the friction clutch is not activated and otherwise a rotational speed gradient value which is represented by the gradient of a tangent TR is obtained in the same way. Through this reference measurement, the drag torque which acts on the component transmission and which results, for example, from a clutch drag torque and a torque loss of the assigned shaft can be taken into account in the subsequent calculation of the set point value of the clutch actuator for the engagement point of the friction clutch.

While FIGS. 2 to 4 show methods in which the engagement point of the friction clutch can be carried out without using an electric machine, the subsequent FIGS. 5 to 7 illustrate methods according to the invention in which influencing of the multi-step transmission by an electric machine is taken into account in the setting of the engagement point of the friction clutch. These methods correspond, in terms of their general sequence, to the methods described above. The same variables or parameters are therefore characterized by the same reference symbols. Essentially, the differences are explained below.

Figure 5A:
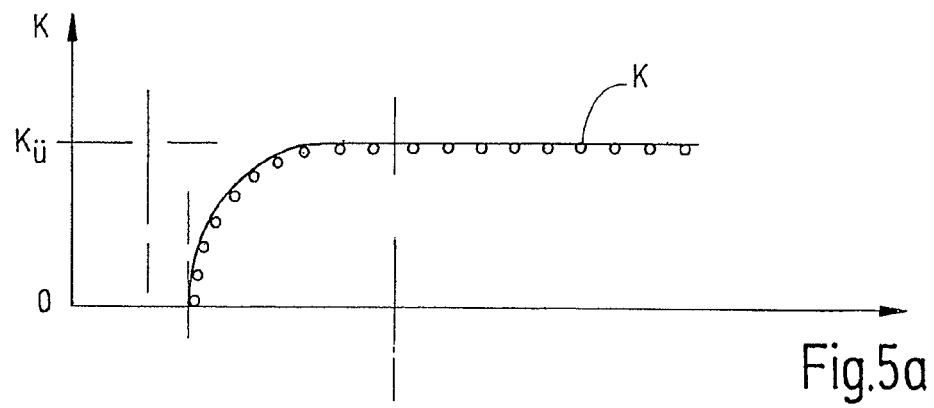
FIG. 5 shows diagrams of a friction clutch manipulated value, of a torque value of the electric machine and of a rotational speed of the electric machine plotted against the time in order to explain methods according to the invention.
Figure 5B:
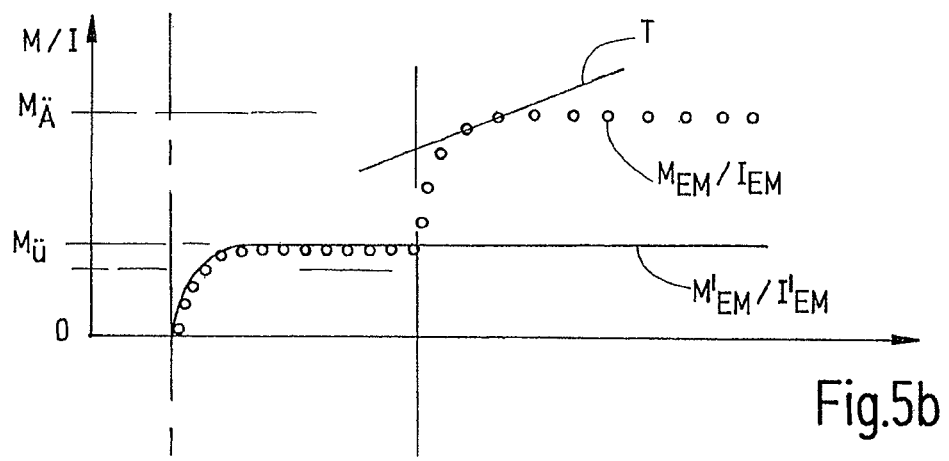
Figure 5C:
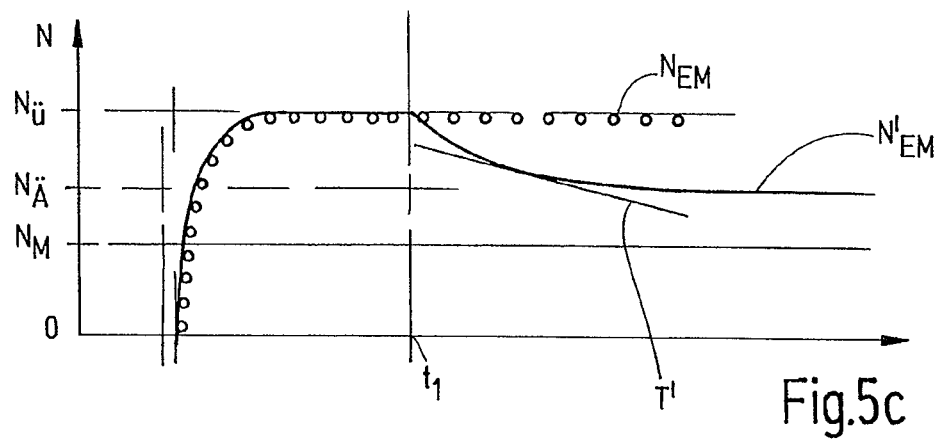

FIG. 5 shows in a schematic form the sequences for the setting of an engagement point of a friction clutch when an electric machine which is connected to the multi-step transmission is in active use. FIG. 5a shows here the clutch travel K plotted against the time. FIG. 5b shows the torque M which is applied by the electric machine plotted against the time, which torque is proportional to the current I flowing through the electric machine. FIG. 5c shows rotational speeds plotted against the time, specifically, on the one hand, the rotational speed $N_M$ of a drive engine of the drive train and, on the other hand, the rotational speed $N_{EM}$ of the electric machine.

FIG. 5 shows two alternative embodiments in this context. The dotted curves show an embodiment in which the electric machine is closed-loop adjusted to a transition rotational speed in order to produce the transition state. The continuous lines show an embodiment in which the electric machine is subject to closed-loop adjusted to a transition torque in order to produce the transition state.

In the first-mentioned embodiment, in the multi-step transmission 10 (that is to say in particular in a free component transmission of a double clutch transmission 10), in which the assigned friction clutch is opened (K=0) the rotational speed $N_{EM}$ of the electric machine is firstly adjusted to a transition rotational speed $N_0$. It goes without saying here that the assigned shift clutches of the multi-step transmission are opened, that is to say there is no gearspeed engaged.

Subsequently, the friction clutch is set to a transition value $K_{\ddot{U}}$, which preferably corresponds to the previous set point value for the engagement point. The transition value is a value at which the clutch can only transmit a relatively low torque, for example <20 Nm.

As soon as the clutch actuator has reached the value of $K_{\ddot{U}}$ ($t=t_1$), a torque is applied to the multi-step transmission 10 by the drive engine which is rotating at a constant rotational speed $N_M$. Since the electric machine performs closed-loop adjustment of the rotational speed $N_{EM}$ constantly to the transition rotational speed $N_{\ddot{U}}$, the torque $M_{EM}$ which is applied by the electric machine (or the electric current $I_{EM}$ flowing through here) changes.

The time profile of the electric current $I_{EM}$ can be measured and evaluated in a comparatively simple way. As in the previous embodiments, for example the current value $M_{\ddot{A}}$ is determined, and said value is a measure of which torque is transmitted by the assigned friction clutch on the basis of the transition value $K_{\ddot{U}}$, or determines a gradient value which is indicated by a tangent T in FIG. 5b. The positive gradient value (gradient value) of the tangent T can in turn be a measure of which torque is transmitted by the assigned friction clutch on the basis of the transition value $K_{\ddot{U}}$. Accordingly, in a subsequent method step the set point value of the clutch actuator K for the engagement point of the assigned friction clutch can be set or adapted on the basis of this current value $M_{\ddot{A}}$ or gradient value. This method is also referred to as kiss point adaptation.

FIG. 5 shows an alternative embodiment in which the rotational speed $N_{EM}$ is not adjusted but instead the torque $M'_{EM}$ which is output by the electric machine is adjusted to a constant transition value $M_{\ddot{U}}$. In this embodiment, the clutch is in turn set to the transition value $K_{\ddot{U}}$ at the time $t_1$. At this time, the rotational speed $N'_{EM}$ changes. Similarly to the previous embodiments, a rotational speed gradient value is determined, and this is indicated schematically in FIG. 5c by a tangent T' (or a final value $N_{\ddot{A}}$ of the rotational speed which is set). The final value and/or rotational speed gradient value is in turn a measure of which torque is transmitted by the friction clutch on the basis of the transition value $K_{\ddot{U}}$. Accordingly, the set point value of the clutch actuator K for the engagement point of the assigned friction clutch can be set or adapted on the basis of this final value or the rotational speed gradient value.

FIG. 6 shows an alternative method for setting the engagement point of a friction clutch using an electric machine. FIG. 6a shows here in turn the actuation travel K of a clutch actuator plotted against the time. FIG. 6b shows the actuation travel S of a shift actuator plotted against the time. FIG. 6c shows rotational speeds plotted against the time, specifically, on the one hand, the rotational speed $N_M$ of a drive engine and, on the other hand, the rotational speed $N_{EM}$ of the electric machine.

FIG. 6 shows here, from a time $t_3$ up to a time $t_6$ a method for setting the engagement point of a friction clutch whose sequence corresponds essentially to FIG. 2. In a time window from $t_0$ to $t_2$ a reference measuring method which precedes the actual setting method is shown, and the sequence thereof corresponds essentially to the reference method in FIG. 4.

Before the time $t_0$, the clutch actuator of the friction clutch is at a value $K_V$ at which no torque is being transmitted by the friction clutch but the friction clutch is, however, only a relatively short distance before the engagement point. In addition, a gear speed ($S=S_{\ddot{U}}$) is engaged in the assigned component transmission of the double clutch transmission 10. The drive engine runs as assumed at a constant rotational speed $N_M$. As a result of the engaged gearspeed ($S=S_{\ddot{U}}$), the rotational speed $N_{EM}$ of the electric machine is set to a transition value $N_{\ddot{U}}$. Subsequently, at $t=t_0$ the shift clutch is opened ($S=S_O$) without the friction clutch being closed. At a time $t_1$, the shift clutch consequently no longer transmits any torque from the transmission output shaft to the multi-step transmission, with the result that the rotational speed $N_{EM}$ of the electric machine drops. A rotational speed gradient value is in turn calculated from this profile and is indicated schematically in FIG. 6c at $T_R$. This rotational speed gradient value is a measure of the drag torques which are present in the multi-step transmission, including a clutch drag torque, drag torques owing to friction in the transmission and including a machine drag torque of the electric machine.

In this embodiment, the electric machine is not closed-loop adjusted to a rotational speed but is instead coupled as a load to the multi-step transmission. In this context, the electric machine can be operated for the entire period of the setting method either in the idling mode or operated in the short-circuit mode.

The actual setting method takes place starting from the time $t_2$. In this context, the shift clutch is initially shifted again to the transition value, with the result that a gear speed is engaged ($S=S_{\ddot{U}}$ at $t_2$). As a result, the rotational speed $N_{EM}$ of the electric machine increases again to the transition value $N_{\ddot{U}}$. Subsequently (or essentially parallel thereto), the clutch actuator is moved in the direction of the transition value $K_{\ddot{U}}$ at the time $t_3$. As soon as the clutch actuator K is at the value $K_{\ddot{U}}$, the shift actuator is operated again in order to open the assigned shift clutch ($S=S_O$). As soon as this is the case (for example at the time $t_s$), the rotational speed $N_{EM}$ of the electric machine drops again. A rotational speed gradient which is determined in the process is represented in turn by a tangent T. Since, in the setting method, the friction clutch transmits a certain torque and the drive engine runs at the rotational speed $N_M$, a different rotational speed gradient value from that in the previous reference measurement is obtained. Consequently, in the actual method the drag torques are calculated. The rotational speed gradient value T or the difference between the rotational speed gradient value T and the rotational speed gradient value $T_R$ therefore constitutes a measure of the torque which is transmitted by the friction clutch and which is transmitted when the clutch actuator K is set to the transition value $K_{\ddot{U}}$. On this basis, the engagement point of the friction touch can be set precisely.

Since in this method, in contrast to the illustration in FIG. 2, the electric machine is operated as a load, relatively large rotational speed gradient values (relatively steep tangents T) occur. Accordingly, the engagement point of the friction clutch can be set more precisely.

FIG. 7 shows further embodiments of methods according to the invention for setting the engagement point of a friction clutch. FIG. 7a shows here in turn the actuation travel of the clutch actuator K plotted against the time. FIG. 7b shows the torque M which is transmitted by the electric machine and the electric current I flowing through it, plotted against the time.

FIG. 7c shows the rotational speeds plotted against the time, to be precise the rotational speed of the electric machine and the rotational speed of a drive engine.

FIGS. 7b and 7c illustrate here the different methods for including the electric machine in the setting of the engagement point of a friction clutch. The method in which the rotational speed $N_{EM}$ of the electric machine is closed-loop adjusted to a constant value is shown in continuous lines. Dashed lines show the corresponding method in which the torque $M_{EM}$ is closed-loop adjusted from a constant value. Dot-dashed lines show the method in which the electric machine is operated as a load, specifically in the idling mode. Dotted lines show the method in which the electric machine is operated as a load, specifically in the short-circuit mode. FIG. 7 shows in turn a reference measuring method from a time period $t_0$ to $t_2$. The actual method for determining the engagement point is shown from $t_3$ to $t_6$.

In the reference method, the clutch is again at the value $K_V$ at which no torque is transmitted. In this context, the electric machine is in the transition state in the time period from $t_0$ to $t_1$, wherein the rotational speed $N_{EM}$ is at a transition rotational speed $N_Ü$, and the torque $N_{EM}$ has a transition value $M_Ü$.

At least in the embodiments in which the electric machine is not operated solely as a load but rather is adjusted to a transition rotational speed $N_Ü$ or a transition torque $M_Ü$ and the clutches of the assigned component transmission are opened, different working points can be set here, as indicated by arrows. It is therefore possible, for example, to vary a differential rotational speed across the friction clutch between the rotational speeds $N_Ü$ and $N_M$ in order to set the different working points. This is not possible in the prior art in which the differential rotational speed across the friction clutch arises essentially from the current rotational speeds of the drive engine and the transmission output shaft. Consequently, the friction clutch can be set not only for one working point but also in direct succession for different working points, and can therefore be optimized overall in terms of the respective engagement points.

The reference method from $t_0$ to $t_2$ can be carried out here similarly for the cases in which the electric machine is operated as a load, as shown for example in FIG. 6. However, alternatively it is also possible for this case to perform closed-loop adjustment of the electric machine to a specific working point in this time period, and to switch over to the load operating mode at a time $t_1$ (either in the short-circuit mode or in the idling mode). This also results in a change in rotational speed, the rotational speed gradient thereof can be calculated in order to determine the drag torque.

In a corresponding way, an active torque closed-loop control intervention or rotational speed closed-loop control intervention can in turn take place subsequently at the transition to the actual measuring method in a time period from $t_2$ to $t_3$, in order to switch the electric machine over to the closed-loop controlled operating mode again. Starting from the time $t_3$, the clutch actuator K is subsequently set to the transition value $K_Ü$. At the time $t_4$ it is then possible to switch over again to the load operating mode, with the result that a drop in rotational speed occurs again.

In this embodiment, the electric machine can be operated as a load in order to determine the engagement point of the friction clutch, wherein the clutches of the assigned component transmission are opened.

At the time $t_4$, switching over occurs in this case from a closed-loop control operating mode to the load operating mode, with the result that in turn a change in rotational speed occurs, the rotational speed gradient value of which can be used to set the engagement point of the friction clutch.

In the embodiments in which the electric machine is closed-loop adjusted continuously in each case (either to the rotational speed $N_{EM}$ or to the torque $M_{EM}$), the change in rotational speed at the time $t_4$ is obtained by the transmission of torque from the drive engine to the multi-step transmission (when $K=K=K_Ü$).

It is apparent here that in this case also the working points may be variable, as is shown by corresponding arrows in the range between $t_5$ and $t_6$ in FIGS. 7b and 7c.

Otherwise, the methods in which the electric machine is adjusted to a working point occur in principle in an identical way, as is shown in FIG. 5.

In addition, FIG. 7a shows that the value of $K_Ü$ is also variable. The value of $K_Ü$ can therefore be set iteratively by repetitions of the method, as is indicated by an arrow which jumps back laterally.

What is claimed is:

1. Method for setting an engagement point of a friction clutch of a multi-step transmission for a motor vehicle, wherein the method is performed by a control device of the multi-step transmission, wherein the friction clutch can be activated, controlled, utilizing a clutch actuator, wherein a set point value of the clutch actuator is set for the engagement point of the friction clutch as a function of a time profile of a physical variable which occurs starting from a transition state after activation of the friction clutch to a predefined transition value,
wherein an electric machine is fixedly connected to the multi-step transmission, and wherein influencing of the multi-step transmission by the electric machine is taken into account in the setting of the engagement point of the friction clutch.

2. Method according to claim 1, wherein producing the transition state includes setting the electric machine to a transition working point.

3. Method according to claim 2, wherein producing the transition state includes carrying out closed-loop adjustment of the electric machine to a transition rotational speed.

4. Method according to claim 3, wherein the set point value of the clutch actuator for the engagement point of the friction clutch is set as a function of a time profile of an electric current of the electric machine, which electric current occurs starting from the transition state after activation of the friction clutch to the transition value.

5. Method according to claim 2, wherein the production of the transition state includes carrying out closed-loop control of the electric machine to a transition torque.

6. Method according to claim 5, wherein the set point value of the clutch actuator for the engagement point of the friction clutch is set as a function of a time profile of a rotational speed which occurs starting from the transition state after activation of the friction clutch to the transition value.

7. Method according to claim 1, wherein the electric machine is coupled as a load to the multi-step transmission, wherein the production of the transition state includes activating at least one shift clutch for the engagement and disengagement of a gearspeed of the multi-step transmission utilizing a shift actuator, and wherein the set point value of the clutch actuator for the engagement point of the friction clutch is set as a function of a time profile of a rotational speed which occurs if the shift clutch is opened after the transition state is produced.

8. Method according to claim 7, wherein the electric machine is operated in the idling mode during the transition state.

9. Method according to claim 7, wherein the electric machine is operated in the short-circuit mode during the transition state.

10. Method according to claim 7, wherein the shift actuator is actuated in the transition state in order to close the assigned shift clutch.

11. Method according to claim 7, wherein the shift actuator is actuated in the transition state in order to transmit a larger torque across the shift clutch than across the friction clutch, without closing the assigned shift clutch.

12. Method according to claim 7, wherein the engagement point of the friction clutch is set in a non-active branch of a double clutch transmission, while the vehicle is travelling, and wherein the shift clutch which is used for setting the engagement point of the friction clutch is assigned to the gearspeed which is adjacent to the gearspeed which is used in the active branch.

13. Method according to claim 1, wherein the clutch actuator in the transition state is set to a transition value which corresponds to the previous set point value for the engagement point.

14. Method according to claim 1, wherein the engagement point of the friction clutch is set in a non-active branch of a double clutch transmission while the vehicle is travelling.

15. Method according to claim 1, wherein the engagement point of the friction clutch is set while the vehicle is stationary.

16. Method according to claim 1, wherein, before the engagement point is set, a reference measurement is carried out without activation of the friction clutch in order to take into account the drag torque acting in the process.

* * * * *